July 28, 1959  M. TOTH  2,896,734
HYDRAULIC STEERING SYSTEM FOR JOINTED VEHICLES
Filed Sept. 27, 1957  4 Sheets-Sheet 1

Inventor
Michael Toth
By Henry J. Maciniak
Attorney

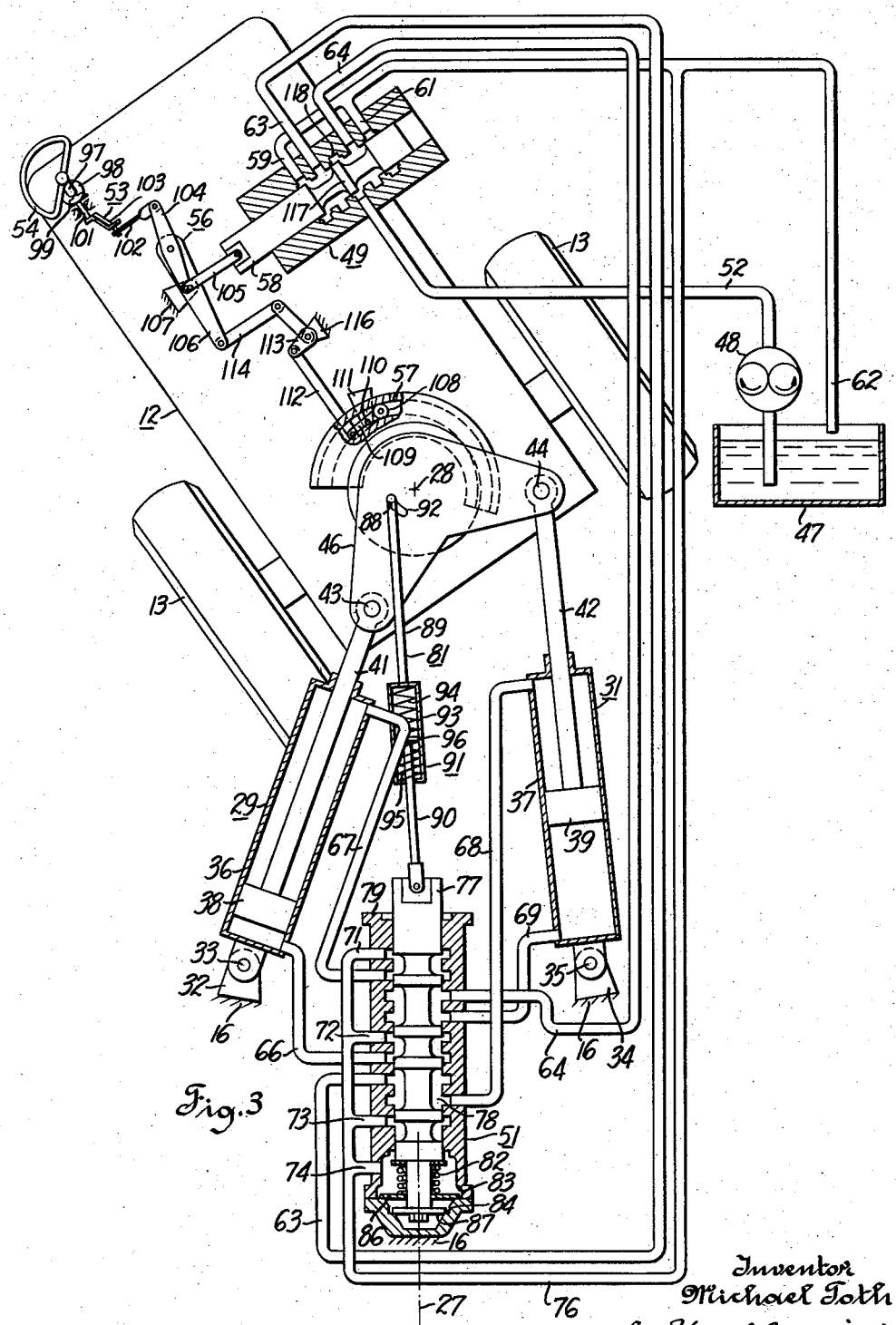

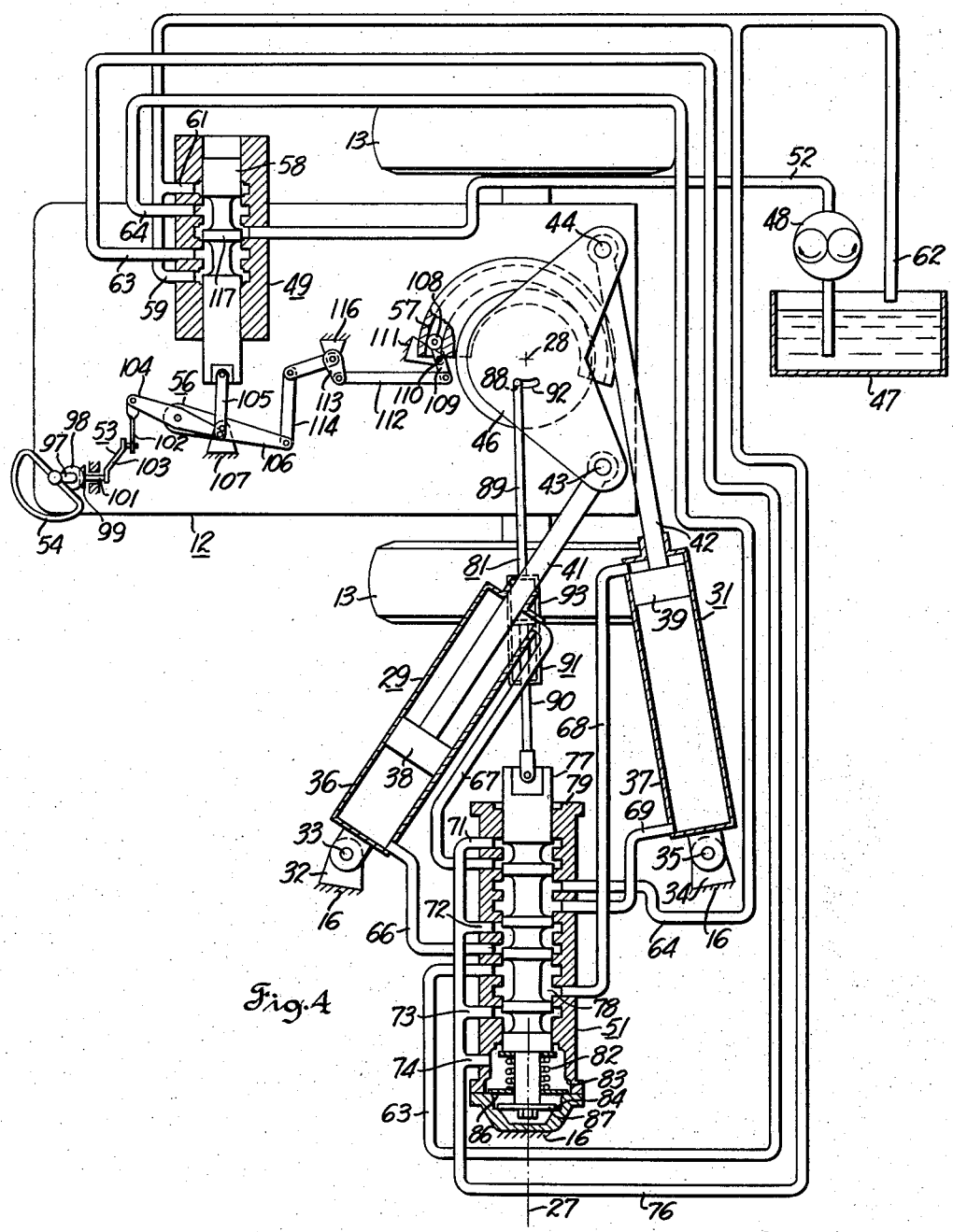

United States Patent Office 2,896,734
Patented July 28, 1959

2,896,734

HYDRAULIC STEERING SYSTEM FOR JOINTED VEHICLES

Michael Toth, Springfield, Ill., assignor to Allis-Chalmers Manufacturing Company, Milwaukee, Wis.

Application September 27, 1957, Serial No. 686,612

7 Claims. (Cl. 180—79.2)

The present invention relates to the steering of vehicles and more particularly to an improved hydraulic steering system for effecting power steering at the fifth wheel connection between the draft unit and trailing unit of a motor vehicle or for effecting the horizontal angling of a dirigible unit of a vehicle having one or more ground engaging wheels.

This invention is particularly adaptable to the steering of the heavy off the road type of vehicles in which a wheel supported front unit and a wheel supported rear unit are pivotally connected with each other for relative horizontal angling about a common vertical axis of articulation. An example of this type of vehicle is the well known motor scraper used in earth moving operations. It generally has a two or four wheel draft unit pivotally connected at its rear end with a trailing unit in the form of a wheel mounted scraper bowl.

When heavy vehicles such as motor scrapers are operated off the road, considerable steering resistance may be encountered under varying operating conditions. As a two wheel draft unit pulls a scraper, one of the wheels may contact loose gravel or other material while the opposite wheel may engage a solid clump of ground with the result that one wheel exerts a tractive effort while the other wheel slips. Such a condition may cause a vehicle to dangerously jackknife. On rough terrain one of the wheels of the tractor may get caught in a rut which may tend to swing the tractor unit about the axis of articulation relative to the scraper unit. Therefore, in addition to providing the necessary torque to cause a turning movement of the tractor unit relative to the scraper unit, the steering mechanism must also be capable of resisting the external forces acting on the system. To provide the necessary torque two or more hydraulic rams are generally desirable in lieu of a single larger type of jack.

The desirability of providing some form of speed control for the steering operation is well recognized. Controlled variations in the speed of steering may be accomplished by increasing and decreasing the power fluid supplied to the hydraulic rams operating the steering mechanism. An apparatus of the prior art using two pumps to vary the power fluid supplied is shown in the United States patent to George E. Armington, U.S. 2,583,197, issued on January 22, 1952. In the present invention it is contemplated to accomplish high and low speed steering by the use of a single hydraulic pump installed in a novel steering system.

A motor scraper is ordinarily driven in a straight course driving condition. In such a driving condition, the draft unit and the scraper unit are in straight longitudinal alignment with each other. For angular displacements from the straight course driving condition, it is desirable that a maximum turning torque be exerted by the steering mechanism to effect and resist any relative angular displacements. The steering mechanism should be capable of delivering a steering torque through a total steering arc of 100° so that the tractor unit and the scraper unit may be angled from the straight course condition to either side through an arc of 90°. A low speed high torque steering adjustment should be available to make the necessary corrections to maintain the vehicle in a straight course driving direction. However, it is desirable that a high speed steering adjustment be available when the vehicle is being maneuvered. From a standpoint of operational efficiency an unduly long period of time should not be required to angle the draft and scraper units through an arc of 90°. The steering movement should be controllable so that it can be accelerated during the larger relative angular displacements of the two units.

It is also desirable that the hydraulic system employed give the operator the usual "steering feel," such as would be encountered in operating a conventional automobile. In other words, when the operator turns the steering wheel to effect a turn to the right, it should not be necessary for the operator to return the steering wheel to a middle or neutral position in order to shut off the power fluid supply when the units have reached a desired relative angular displacement. A true type of "steering feel" would not be present in a system having a steering wheel directly connected to a conventional hydraulic control valve. In such a steering arrangement, turning the wheel to the right or left simply causes the hydraulic control valve to open ports directing the flow of power fluid to the hydraulic rams. The steering wheel would have to be returned to a midposition whenever a desired angular displacement was obtained.

In order that a steering system impart a conventional "steering feel," it is necessary that the angular displacement of the steering wheel be correlated with the relative angular displacement of the two articulated units forming the motor scraper or other vehicle. To accomplish this desirable result, it is necessary that a suitable follow up mechanism be provided to relate the position of the hydraulic control valve actuated by the steering wheel with a corresponding angular displacement of the articulated units.

It is also a requirement of such a steering system that when any shock reaction is imparted to the system by road impact or other external force, it must not aggravate the resulting steering deviation. This requirement is particularly important where the steering system is used in the articulated type of vehicles being used and operated over rough terrain, such as motor scrapers. In such vehicles it is desirable that the steering system utilize the shock impact to effect automatically a correction to the steering deviation.

Generally, it is an object of this invention to provide an improved power operated steering system wherein low speed and high torque is provided during an initial predetermined range of angular displacements and high speed steering is provided for a secondary range of angular displacement.

More specifically, it is an object of this invention to provide an improved steering system for vehicles wherein a cam actuated follow up valve admits power fluid to two hydraulic rams used to horizontally angle the articulated units of a vehicle during a first range of predetermined angular displacements and during a secondary range of angular displacements blocks off the supply of power fluid to one of said rams and directs the entire power fluid supply to the other ram.

A further object of this invention is to provide an improved steering system that will automatically compensate for steering deviations caused by road impact or other external forces.

It is still a further object of this invention to provide an improved steering system of the hereinbefore outlined character that can be operated by controls that have the usual "steering feel" of a conventional automotive system.

Another object of this invention is to provide an improved power operated steering mechanism for vehicles which will take care of the aforementioned outlined requirements in a practical and fully satisfactory manner.

The foregoing and other objects and advantages are obtained by the present invention, various novel features of which will become apparent as the following specification is read in conjunction with the accompanying drawings, wherein.

Figure 2:
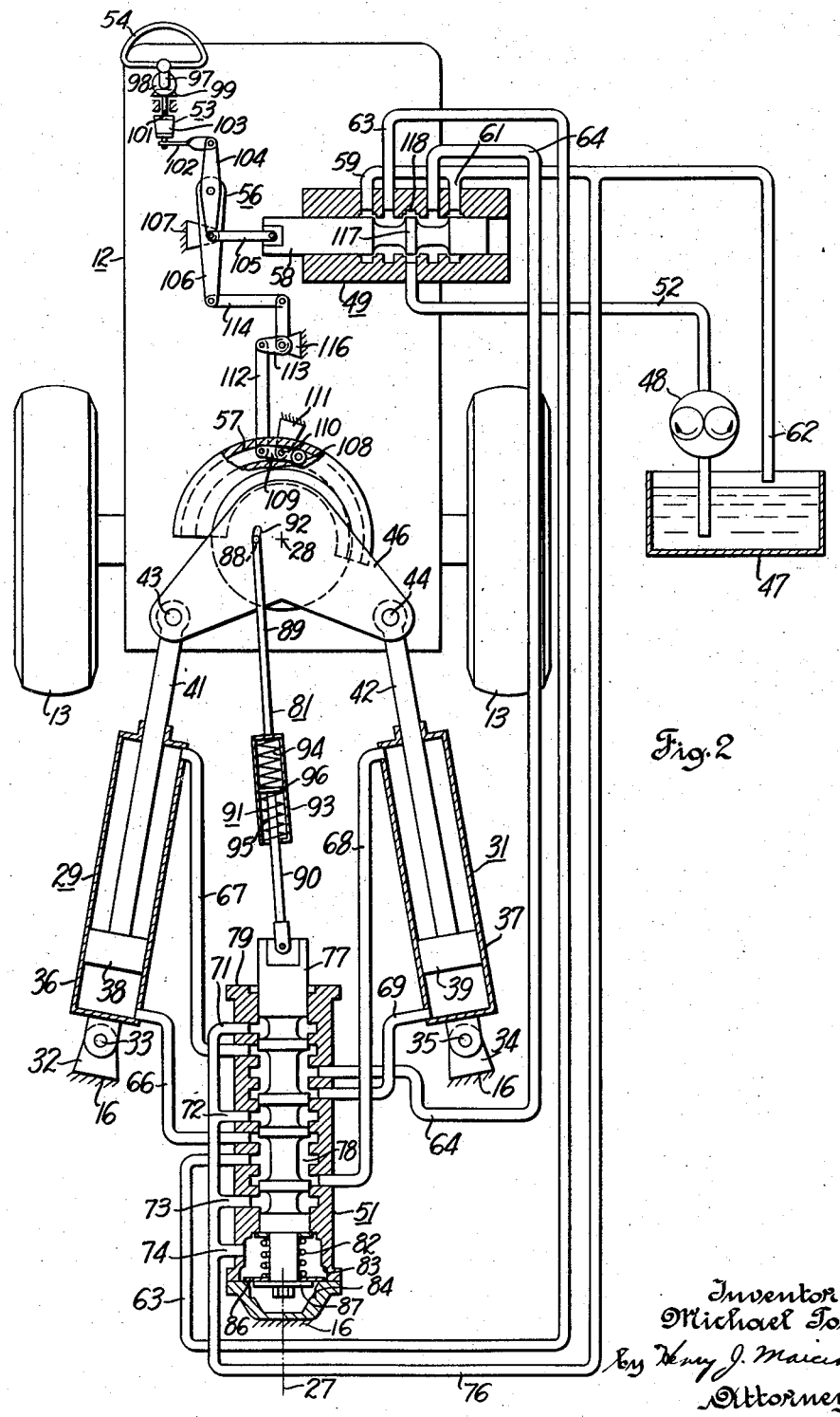
Fig. 2 is a schematic plan view showing the preferred embodiment of the steering system and its associated follow up mechanism in a condition for straight course driving.

Fig. 3 is a view similar to Fig. 2, but illustrating a steering condition when the draft unit of an articulated vehicle is returned to a predetermined angular displacement to the left from the straight course driving position; and Fig. 4 is a view similar to Fig. 2, but illustrating a steering condition when the draft unit of an articulated vehicle is turned 90° to the left from the straight course driving position.

While the apparatus embodying the present invention may be employed in a variety of vehicles, the invention is illustrated in an earth moving vehicle, a motor scraper 11, which is made up of a two wheel draft unit 12 having a pair of traction wheels 13 driven by an engine. The draft unit 12 is connected by means of a pivot or fifth wheel assembly 14 with a trailer unit 16 which includes a gooseneck 17, a transverse frame bar 18 and a scraper bowl 19 having a pair of rear support wheels 21 mounted for rotation about an axis 22 parallel to the transverse frame bar 18. The gooseneck 17 and the transverse frame bar 18 are integral parts of a hitch yoke 23 which also has a pair of rearwardly extending arms 24 pivotally connected at their ends to the scraper bowl 19.

The draft unit 12 and trailer unit 16 are aligned for straight course driving when the axis of rotation 26 of the wheels 13 is parallel to the transverse frame bar 18. The gooseneck 17 is so arched upwardly that when the draft unit 12 is angled 90° to the left or right of the longitudinal axis 27 of the hitch yoke 23, the wheels 13 pass under with ample clearance.

The wheels 13 and 21 are not steerable in relationship to either the draft unit 12 or the trailer unit 16. The steering of the vehicle 11 is accomplished by adjusting the angular position of the draft unit 12 with respect to the hitch or the trailer unit 16. Thus, in the preferred embodiment of this invention, the draft unit 12 serves as the dirigible unit of the vehicle.

The draft and trailer units 12, 16 are pivotally interconnected for relative horizontal angling about a common vertical axis 28. The connecting yoke 23 is rotatably supported to permit lateral tilting of the draft unit 12 relative to the trailer unit 16. This type of hitch connection permits a limited amount of lateral tilting between the trailer unit 16 and the draft unit 12 and also permits the draft unit 12 to be angled horizontally relative to the trailer unit 16 to permit steering.

Figure 1:
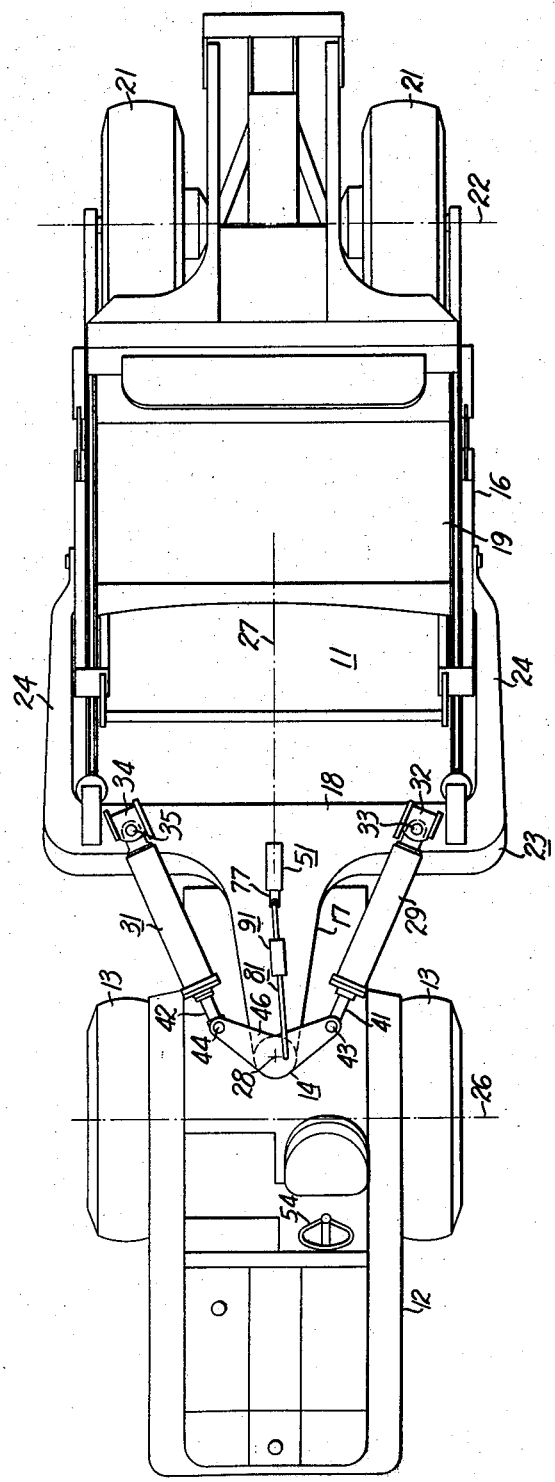
Fig. 1 is a top view of a motor scraper illustrating a preferred embodiment of the steering system of the present invention when the motor scraper is in a condition for straight course driving.

The extensible thrust transmitting elements of the steering system are the two hydraulic jacks 29, 31 which are pivotally connected to the trailer unit 16 at some suitable location. Whether the hydraulic jacks 29, 31 are pivotally connected to the gooseneck 17 or to the transverse frame bar 18 in a given installation is not material to this invention. As shown in the preferred embodiment illustrated in Fig. 1, the jacks 29, 31 are connected to the transverse frame bar 18. The brackets 32, 34 and the pins 33, 35 form the pivotal connections on the frame bar 18. Referring to Fig. 2, the cylinders 36, 37 reciprocably receive the pistons 38, 39 to which are attached the forwardly extending piston rods 41, 42, respectively, and serve as the fluid motors by which power steering is effected.

The ends of the piston rods 41, 42 are pivotally attached to pivot pins 43, 44 mounted on a steering bell crank 46 which presents a pair of torque arms against which the thrust force of the steering jacks 29, 31 is exerted. The apex of the bell crank 46 is rigidly attached to the draft unit 12. Although the bell crank 46 is laterally tiltable with respect to the draft unit 12, it is horizontally rigid with respect thereto. A horizontal thrust force exerted against one of the torque arms of the bell crank 46 causes a turning moment about the vertical axis 28 so long as the direction of the thrust force does not intersect the axis 28. As will hereinafter be fully described, when the line of action of the thrust force intersects the axis 28, the effective torque arm is zero in value and no turning torque about the axis 28 results.

The hydraulic circuit of the steering system of this invention comprises essentially a reservoir 47 for the storage of hydraulic fluid, a conventional pressure pump 48, a main hydraulic control valve 49, an auxiliary follow up valve 51, the hydraulic jacks 29, 31, and the various connecting lines. The control valve 49 and the auxiliary follow-up valve 51 comprise a control means for directing the flow of hydraulic fluid from and to the jacks 29, 31. The fluid discharge from the pump 48 is conducted to the main hydraulic control valve 49 by the supply line 52. The main control valve 49 is located on the draft unit 12 as shown schematically in Figs. 2, 3 and 4. It is a spool type of valve and is operated by a driver mechanism 53 controlled by a steering wheel 54 and by a follow up mechanism 56 actuated by a cam 57 rigidly associated with the hitch yoke 23. The follow up mechanism 56 is more generally referred to in the appended claims as a second motion transmitting means.

The main control valve 49 has an axially shiftable valve spool 58. Two branches 59, 61 connect the valve 49 with a main return conduit 62 and two conduits 63, 64 connect the valve 49 with the follow up valve 51. Depending upon the position of the main control valve 49, the two conduits 63, 64 can be used to conduct power fluid to or return fluid from the follow up valve 51. The two steering jacks 29, 31 are connected to the follow up valve 51 by four flexible conduits 66, 67, 68, 69. The auxiliary follow up valve 51 has four branches 71, 72, 73, 74 connecting with the intermediate return conduit 76.

The auxiliary follow up valve 51 is a multiported type of valve having a slidable valve spool 77 centrally disposed within a central bore 78 formed in a body 79. Formed in the central bore 78 are a series of ten axially spaced annular recesses each of which has a port connecting with one of the conduits 63, 64, 71, 72, 73, 74 and branches 66, 67, 68, 69. The valve spool is formed with a series of annular grooves and collars. The annular recesses in the valve bore 78 form a series of lands. As the individual collars of the valve spool 77 overlap the lands formed in the valve body 79, individual sealed chambers are formed for the purpose of interconnecting the various conduits and branches in a preselected manner. The annular grooves formed in the valve spool 77 cooperate with the adjacent portion of the valve bore 78 to form these individual chambers. It is to be noted that the valve spool 77 never blocks off the ports connecting with the cylinder conduits 66, 67, 68, 69 or the supply conduits 63, 64.

The valve spool 77 of the auxiliary follow up valve 51 is axially shifted by a mechanical linkage 81 connecting one end of the valve spool 77 with the steering bell crank 46. The linkage 81 serves as a position responsive type of linkage in that it relates the position of the valve spool 77 to the relative angular displacement between the draft unit 12 and trailer unit 16. The linkage 81 is more generally referred to in the appended claims as a first motion transmitting means. The other end of the valve spool 77 is biased by a spring 82 to the neutral position. Maximum travel of the valve spool 77 is limited by two shoulders 83, 84. The spool 77 is at the end of its axial travel in one direction when a washer 86 abuts against the shoulder 83 formed in the valve body 79. It is at the end of its travel in the other direction when a washer 87 rigidly connected to the valve spool 77 abuts against the shoulder 84. The valve spool 77 is in a neutral position when the washers 86 and 87 are in the position shown in Fig. 2.

The mechanical linkage 81 includes a follower pin 88, two connecting rods 89, 90, and double acting spring connection 91. The steering bell crank 46 has a circumferential groove 92 in which the follower pin 88 attached to the connecting rod 89 is engaged. The length of the groove 92 determines the amount of predetermined lag desired before the steering bell crank 46 actuates the mechanical linkage 81 to shift the valve spool 77 into another operating position. Obviously, as long as the draft unit 12 is angled between the extreme limits of the groove 92, no motion will be imparted by the steering bell crank 46 to the connecting rod 89.

The double acting spring connection 91 comprises a sleeve 93 rigidly connected to the connecting rod 89, two coil springs 94, 95 and a collar 96 formed on the connecting rod 90. The springs 94, 95 are restrained within the sleeve 93. This spring connection 91 protects the auxiliary follow up valve 51 against damage that might result from overtravel of the valve spool 77.

Steering is controlled from the operator's station by the steering wheel 54 which is nonrotatably connected to a steering shaft 97. Rotational movement of the shaft 97 is transmitted through a pair of bevel gears 98, 99 to a second shaft 101. Rotational movement of the second shaft 101 is converted to lineal movement in a connecting link 102 by the lever arm 103. The lineal movement of the lever arm is transmitted to a main valve control arm 104 which is pivotally carried at an intermediate point on one end of a follow up arm 106. The other end of the main valve control arm 104 is pivotally connected to the valve spool 58 by link 105. The follow up arm 106 is pivotally supported on the draft unit 12 by the bracket 107. Angular movement of the valve control arm 104 causes the valve spool 58 to move axially. The purpose of the driver mechanism 53 is thus to translate an angular movement of the steering wheel 54 into a linear movement of the valve spool 58.

The follow up mechanism 56 serves automatically to return the valve spool 58 to a neutral position after a desired relative angular movement of the draft unit 12 with respect to the trail unit 16 has been accomplished. The follow up mechanism 56 comprises essentially a cam 57 rigidly associated with the forward end of the hitch yoke 23 and a system of connecting links and levers used to transmit the motion imparted by the cam 57 to one end of the follow up arm 106. The cam 57 is so arranged and constructed that for any given relative position of the draft unit 12, a predetermined amount of motion will be imparted to the follow up arm 106 so that the valve spool 58 will be returned to a neutral position.

A cam follower 108 mounted at one end of a lever 109 engages the cam 57. The lever 109 has an intermediate fulcrum point 110 where it is pivotally connected by a support bracket 111 to the draft unit 12. The other end of the lever 109 is connected to a connecting rod 112 which joins the lever 109 with one end of a bell crank 113. The other end of the bell crank 113 is joined with one end of the follow up arm 106 by means of a second connecting rod 114. The apex of the bell crank 113 pivots on a support bracket 116 attached to the draft unit 12. Thus, any movement of the cam follower 108 is transmitted by means of the lever 109, the first connecting rod 112, the bell crank 113, the follow up arm 106, the main valve control arm 104 and the connecting link 105 to valve spool 58.

Referring again to Fig. 2, when the steering wheel 54 is turned in a clockwise direction, the lever 103, as viewed from the rear of the draft unit 12, is rotated in a counterclockwise direction. This causes a connecting link 102 to move to the left and the valve control lever 104 to rotate in a counterclockwise direction, thereby shifting the valve spool 58 to the right. Shifting the valve spool 58 to the right results in an increased supply of power fluid to the conduit 63. The auxiliary follow up valve directs this increased supply of power fluid to the conduits 66 and 68, thereby causing the steering jack 29 to extend and the steering jack 31 to retract, a steering movement of the vehicle to the right is consequently initiated. It should be noted that no movement is imparted to the follow up mechanism 56 until the draft unit 12 begins to turn relative to the trailer unit 16 by virtue of the torque applied to the steering bell crank 46.

As the draft unit 12 and the trailer unit 16 are angled, the cam 57 being stationary with respect to the hitch yoke 23 and the cam roller 108 being fixed with respect to the draft unit 12, the cam roller 108 is set in motion. An angular displacement of the draft unit 12 to the right causes the lever 109 to rotate in a counterclockwise direction about the pivot axis 110. The rotational movement of the lever 109 is transmitted by the connecting rod 112 to the bell crank 113 which is also caused to rotate in a counterclockwise direction. The bell crank 113 further transmits rotational movement by means of the connecting rod 114 to the follow up arm 106. The clockwise rotation of the follow up arm 106 causes a counterclockwise rotation of the valve control arm 104. The valve spool 58 is thereby moved to the left and returned to the neutral position.

In Fig. 2, the steering system is shown schematically for a vehicle in a straight course driving condition. The trailer unit is represented by the diagonal lined portion 16. The longitudinal axes of the hitch yoke 23 and the auxiliary follow up vertical plane are identified in Figs. 2, 3 and 4 by the numeral 27.

Both the main control valve 49 and the auxiliary follow up valve are shown in Fig. 2 in a neutral position. The main control valve 49 in its neutral position directs the flow of power fluid into both supply conduits 63, 64 connecting with the follow up valve 51 where it is conducted by the conduits 66, 67, 68, 69 to both ends of each of the steering jacks 29, 31.

Some of the power fluid entering the main control valve 49 is recirculated through the return branches 59, 61 to the reservoir 47. The follow up valve in its neutral position permits none of the power fluid in the system to be recirculated to the reservoir 47. The flow of power fluid is directed to each side of the pistons 38, 39. Thus, the hydraulic pressure exerted on either side of the pistons 38, 39 is effectively equalized and no motion is imparted to either of the piston 38, 39. The steering jacks 29, 31 are hydraulically locked. It is to be noted that when the main control valve 49 is in a neutral position, a collar 117 of the spool 58 and an annular recess 118 combine to present a restriction to the flow of oil and function as an orifice to reduce the pressure of the oil and to divide the oil flow.

When minor steering adjustments are made, the valve spool 58 is shifted slightly to the left or to right of its neutral position but not enough to completely block off the supply of pressure fluid to both of the supply conduits 63, 64. Slight axial displacements serve to decrease the restriction to the passage of oil to one of the supply conduits 63, 64 and to increase the restriction presented to the passage of fluid to the other supply conduit. Thus, when the steering wheel 54 is turned slightly to the left and the valve spool 58 is shifted off its central position to the left, the oil flow and pressure to conduit 63 is reduced while the oil flow and pressure of the supply conduit 64 is increased. This causes an increase in fluid pressure on the head side of the piston 39 and a decrease of the fluid pressure acting on its rod side. Also, at the same time, the fluid pressure on the rod side of piston 38 is increased and the pressure on the head side is decreased. During initial movements to the right or to the left of the straight course driving position, no motion is transmitted by the mechanical linkage 81 to the follow up valve spool 77 because of the play afforded by circumferential groove 92. The draft unit 12 must be angled through a predetermined angle relative to the trailer unit 16 before the connecting rod 89 engages an end of the groove 92. Further angular movement of the draft unit 12 will cause the mechanical linkage 81 to shift the auxiliary valve spool 77 from its neutral position. Thus, from the foregoing description, it can be seen that both steering jacks coact to effect minor angular variations from the straight course alignment of the draft and trailer units 12, 16.

Conventional spring loaded relief valves in communication with both supply conduits 63 and 64 may be used to unload pressure fluid into the return line 62 leading to the reservoir 47 when the pressure exceeds a predetermined maximum limit. Such sudden increases in pressure may be caused by road shock.

Fig. 3 illustrates the position of the various elements of the steering system of the present invention when the vehicle is being steered to the left and the steering jack 29 is aligned on dead center. It is apparent that when the steering jack 29 reaches this position, the effective torque arm is zero. The jack 29 does not exert any turning movement about the axis 28. To accomplish the steering movement of the draft unit 12 as shown schematically in Fig. 4, the operator turns the steering wheel 54 in a counterclockwise direction and holds it in the displaced position. This causes the valve spool 58 to move to the left whereby the collar 117 prevents power fluid from entering into the supply conduit 63. Substantially all of the power fluid is now channeled into the supply conduit 64. In this position the valve spool has also blocked off the return branch 61 and no power fluid is recirculated to the reservoir 47. The mechanical linkage 81 actuated by the groove 92, as the draft unit 12 is angled, positions the valve spool 77 so that the power fluid from conduit 64 is channeled into the cylinder 37 and acts against the head side of the piston 39. The conduits 66, 67 connecting with the cylinder 36 are in communication with the return line 76 leading to the reservoir 47. The steering jack 29 is in a collapsed condition and does not transmit any thrust to the steering bell crank 46. The steering jack 29 is in a collapsed condition only when the draft unit 12 has been angled so that the jack 29 has reached its dead center position with respect to the bell crank 46 or has gone beyond the dead center position.

Increased steering speed is obtained when either steering jack is at or beyond the dead center position because the entire hydraulic output of the pump 48 is used to operate one of the steering jacks. In the position as shown in Fig. 3 the draft unit 12 is in the relative angular position at which the steering speed enters in the second range of steering or the high speed range. If the operator continues to turn the steering wheel 54 to the left, steering movement will proceed to be effected at an accelerated rate until a full 90° steering is effected as shown in Fig. 4.

The high speed range occurs during the steering movement beginning at about the dead center position of either one of the steering jacks to the extreme angular position of the draft unit 12 relative to the straight course driving condition. During the high speed steering range the piston of the collapsed steering jack freely reciprocates within its cylinder.

As shown in Fig. 3, when the steering jack reaches its dead center position with respect to the bell crank 46, the follow up valve spool 77 is at one limit of its axial travel. The washer 87 abuts against the shoulder 84 and any further axial movement of the valve spool 77 is resisted. Thus, during the high speed range the valve spool 77 is not shifted axially by the mechanical linkage 91. Any movement imparted to the linkage 91 by bell crank 46 is taken up by the double acting spring connection 91.

Whenever the operator desires to hold the draft unit 12 in a given angular position, he simply holds the steering wheel 54 in the position which corresponds to a desired relative angular position of the draft unit 12. When the tractor unit is angled to this position by the steering jack 31, the steering follow up mechanism 56 automatically shifts the valve spool 58 back to a neutral position.

When the vehicle is operated on a road with both the draft unit 12 and the trailer unit 16 aligned for straight course driving and the draft unit 12 encounters an obstruction which causes it to angle sharply to the left, the steering system of the present invention automatically adjusts the alignment of the vehicle. An angular rotation of the draft unit to the left causes the follow up mechanism 56 to shift the main control valve spool 58 to the right of the position in which it is shown in Fig. 2. Shifting the spool to the right results in an increased admission of power fluid to the supply conduits 63. From the supply conduit 63 power fluid is directed by the auxiliary follow up valve 51 to the flexible conduit 68 connecting with the rod end of the steering jack 31 and to the flexible conduit 66 connecting with the head end of the steering jack 29, causing the steering jack 29 to extend and the steering jack 31 to contract. In this manner the steering system automatically compensates any steering movement caused by external forces acting against the ground engaging wheels 13, 21.

When the tractor unit is within the low speed steering range, any shock externally imposed on the follow up mechanism 56 also tends to correct the steering movement. Thus, when the vehicle is being maneuvered with the vehicle in a fixed angular position, the control valve spool 58 is shifted from the neutral position to admit additional power fluid to one of the steering jacks to resist the forces disturbing the fixed angular relationship between the draft unit 12 and trailer unit 16. In the event that the control valve follow up mechanism 56 is actuated by an externally imposed impact before the draft unit 12 has been brought to the desired angular position corresponding to the wheel position, the steering jacks 29, 31 will either resist or be aided by the impact.

The present invention provides a steering system that is controlled by a steering wheel having a conventional "steering feel." When the angular relationship between the draft unit and trailer unit falls within a predetermined range, a slow speed steering effect is available. When the angular relation exceeds the first predetermined range, a second range is available and the steering speed is automatically increased as the vehicle is angled. High speed steering is therefore available where it is most needed. It is available when the time consuming operation of angling the vehicle sharply is required. Thus, the vehicle can be quickly angled when maneuvering in close quarters. In the case of motor scrapers and other off the road type of vehicles, such maneuvering is frequently required during loading and unloading phases of operation.

While only one particular embodiment of the applicant's invention has been described herein, it should be understood that the applicant's invention is not restricted thereto, and that it is intended to cover all modifications

What is claimed is:

1. A steering system for a vehicle having a dirigible unit with one or more ground engaging wheels pivotally connected for horizontal angling of said unit about a vertical axis and having a hydraulic circuit including a pump, reservoir, supply and return lines to direct power fluid to a pair of double acting hydraulic steering jacks, said steering system comprising: a main control valve interposed in said supply and return lines, an auxiliary follow up valve interposed in the supply and return line between said steering jacks and said main control valve, a motion transmitting means operatively connecting said dirigible unit with said auxiliary follow up valve so as to actuate said control valve in response to changes in the relative angular position of said dirigible unit to said vehicle, said auxiliary follow up valve directing the flow of power fluid to both steering jacks when said dirigible unit is angled a predetermined angular distance from a straight course driving position and said auxiliary follow up valve blocking the supply of power fluid to one of said steering jacks when said jack reaches near its dead center position in relationship to said vertical axis thereby directing the entire power fluid supply to the other of said steering jacks to increase the steering speed.

2. In a vehicle having a dirigible unit with one or more ground engaging wheels pivotally mounted for horizontal angling about a vertical axis, said vehicle having a hydraulic circuit including a pump, a reservoir, fluid supply and return lines, and a pair of double acting steering jacks operatively connected at one end to torque arms on said dirigible unit and at the other end to said vehicle, a steering system comprising: a main control valve interposed in said supply and return lines of said hydraulic circuit to regulate flow of pressure fluid from said pump, an auxiliary follow up valve operatively interposed in said supply and return lines between said hydraulic steering jacks and said main control valve and mounted on said vehicle, a motion transmitting means operatively connected to said dirigible unit and said auxiliary follow up valve so that when said dirigible unit is angled to a predetermined angular position with respect to said vehicle said auxiliary follow up control valve is actuated to block off the supply of the power fluid to one of said steering jacks and directs the entire supply of power fluid to the other of said steering jacks thereby increasing the steering speed.

3. A hydraulic steering system for a vehicle having a dirigible unit with one or more ground engaging wheels pivotally mounted for relative horizontal angling about a vertical axis, said vehicle having a hydraulic circuit including a pump, a reservoir, supply and return lines to conduct pressure fluid to and from a pair of double acting hydraulic steering jacks mounted on said vehicle and operatively connected to torque arms on said dirigible unit, said steering system comprising: a main hydraulic control valve operatively interposed in said supply and return lines, an auxiliary follow up valve having a slidable valve spool and operatively interposed between said steering jacks and said main control valve; a motion transmitting means operatively connected to said dirigible unit to transmit motion resulting from the angular displacement of said dirigible unit to said slidable valve spool, said valve spool being shiftable by said motion transmitting means to block the supply of power fluid to one of said steering jacks when said dirigible unit is angled to a predetermined angular position with respect to said vehicle in order that the entire supply of power fluid may be directed to the other of said steering jacks to increase the steering speed.

4. A steering system for a vehicle having a dirigible unit with one or more ground engaging wheels pivotally mounted for relative horizontal angling of said unit about a vertical axis, said vehicle having a hydraulic circuit including a pump, a reservoir, and supply and return lines to conduct pressure fluid to and from a pair of double acting hydraulic steering jacks operatively connected at one end to said vehicle and at the other end to torque arms on said dirigible unit, said steering system comprising: a main control valve having a slidable valve spool and a neutral position in which pressure fluid is directed to said steering jacks so as to hold said jacks in hydraulic restraint, said main control valve being operatively interposed in said supply and return lines; an auxiliary follow up valve having a slidable valve spool and being interposed between said steering jacks and said main control valve; a first motion transmitting means operatively connecting said dirigible unit and said valve spool of said auxiliary follow up valve so that said valve spool of said auxiliary follow up valve will block the supply of power fluid to one of said steering jacks when said dirigible unit is angled to a predetermined angular position with respect to said vehicle; and a second motion transmitting means operatively connecting said dirigible unit with said valve spool of said main control valve in order to return said main control valve spool to a neutral position when a desired angular position is reached.

5. A hydraulic steering system for an articulated vehicle having a draft unit and a trailer unit pivotally interconnected for relative horizontal angling about a vertical axis, said vehicle having a hydraulic circuit including a pump, a reservoir, supply and return lines to conduct pressure fluid to and from a pair of double acting hydraulic steering jacks mounted on one of said units and operatively connected to torque arms on the other of said units, said steering system comprising: a main control valve having a slidable valve spool and a neutral position in which pressure fluid is directed to said steering jacks so as to hold said jacks in hydraulic restraint, said main control valve being operatively interposed in said supply and return lines; an auxiliary follow up valve having a slidable valve spool and being interposed between said steering jacks and said main control valve; a first motion transmitting means operatively connecting one of said units with said valve spool of said auxiliary follow up valve so that said valve spool of said auxiliary follow up valve will block the supply of power fluid to one of said steering jacks when said vehicle is angled to a predetermined angular position; and a second motion transmitting means operatively connecting one of said units with said valve spool of said main control valve in order to return said main control valve to a neutral position when a desired angular position is reached.

6. In an articulated vehicle having a draft unit and a trailer unit pivotally interconnected for relative horizontal angling about a vertical hitch axis, said vehicle having a hydraulic circuit including a pump, a reservoir, fluid supply and return lines, and a pair of double acting steering jacks operatively connected at one end to torque arms on one of said units and at the other end to the other of said units, a steering system comprising: a main hydraulic control valve operatively interposed in said supply and return lines and operable from a control station on said vehicle to direct the flow of pressure fluid from said pump, an auxiliary follow up valve operatively interposed in said supply and return lines between said hydraulic steering jacks and said main control valve and mounted on said trailer unit, a motion transmitting means operatively connected to said draft unit and said auxiliary follow up valve so that when said draft unit is angled to a predetermined angular position with respect to said trailer unit said auxiliary follow up control valve is actuated to block off the supply of power fluid to one of said steering jacks and directs the entire supply of power fluid to the other of said steering jacks thereby increasing the steering speed.

7. In a hydraulic steering system for a vehicle having a dirigible unit adapted for horizontal angling about a vertical axis and having a hydraulic circuit including a pump, reservoir, supply and return lines to direct power fluid to a pair of hydraulic motors mounted on said vehicle, the improvement comprising a pair of depending torque arms presented by said dirigible unit and operatively connected to said hydraulic motors, a control means including a main control valve for selectively directing power fluid to said hydraulic motors through the supply and return lines and also including a second valve operatively interposed in said supply and return lines, a motion transmitting means operatively connected to said dirigible unit to transmit motion to said second valve in response to the angular displacement of said dirigible unit, said second valve blocking off the power fluid to one of said hydraulic motors and directing said power fluid to the other of said hydraulic motors when said dirigible unit is angled beyond a predetermined relative angular position from a straight ahead driving position.

References Cited in the file of this patent

UNITED STATES PATENTS

| | | |
|---|---|---|
| 2,557,066 | Armington | June 19, 1951 |
| 2,583,197 | Armington | Jan. 22, 1952 |
| 2,614,644 | Gustafson | Oct. 21, 1952 |

FOREIGN PATENTS

| | | |
|---|---|---|
| 203,148 | Australia | Aug. 2, 1956 |